UNITED STATES PATENT OFFICE.

EDWIN W. GROVE, OF ST. LOUIS, MISSOURI.

TASTELESS QUININ POWDER AND METHOD OF MAKING SAME.

SPECIFICATION forming part of Letters Patent No. 631,632, dated August 22, 1899.

Application filed November 4, 1898. Serial No. 695,498. (No specimens.)

*To all whom it may concern:*

Be it known that I, EDWIN W. GROVE, a citizen of the United States, residing at St. Louis, in the State of Missouri, have invented new and useful Improvements in Tasteless Quinine Powder and Process of Making Same, of which the following is a specification.

My invention relates to a free-running quinine powder, the particles or granules of which consist of a derivative of cinchona-bark carried and protected by a resinous substance which is practically insoluble in the fluids of the mouth, so that the powder is free from quinine taste during ingestion, and to a method of producing the said compound.

The object of my invention is to produce a quinine or other derivative of cinchona-bark in a free-running powdered form in such manner as to be free from the bitter taste of quinine, so that the quinine can be administered dry on the tougne without any disagreeable or unpleasant taste.

In producing this preparation of quinine or other derivative of cinchona-bark I employ the following process: I take of quinine or any of the derivatives of cinchona-bark, say, about eighty ounces, and of a resinous substance, such as colophony, say, about twenty ounces. I place the quinine or other cinchona derivative and the resinous substance into a steam-jacketed vessel and apply sufficient heat to bring the resinous substance and the quinine to a liquid state and then stir until these ingredients are thoroughly united or incorporated with each other. I then allow the mixture to cool and harden and afterward reduce the hardened mass to a powdered form by grinding or any other suitable means. By this process the quinine or other derivative of cinchona-bark is temporarily protected or rendered practically insoluble in the mouth, so that the powder can be conveniently administered dry upon the tongue free from the disagreeable quinine taste.

In the described powder the quinine or other derivative of cinchona-bark is carried and protected by the resinous substance, whereby the former is protected from the taste during ingestion of the powder. This quinine powder can be readily administered dry on the tongue and followed by a swallow of water and, besides being free from the bitter taste of quinine, will obviate the inconvenience and objections that frequently attend the administration of pills and capsules.

The quinine powder which I produce is a free-running one and without the taste of quinine, because it is so carried by the resinous substance as to be practically insoluble in the fluids of the mouth, and it is protected from the taste, provided it is not held in the mouth longer than is necessary in the act of ingestion or swallowing and is capable of dissolving in the stomach more speedily than does the sulphate of quinia when administered incased in capsules or pills that are coated with sugar or gelatin.

Having thus described my invention, what I claim is—

1. The herein-described free-running quinine powder consisting of a derivative of cinchona-bark carried and protected during ingestion by a resinous substance, substantially as described.

2. The herein-described free-running quinine powder consisting of quinine carried and protected by colophony, substantially as described.

3. The herein-described process of producing a free-running quinine powder free from quinine taste which consists in mixing a derivative of cinchona-bark and a resinous substance which is insoluble in water, reducing to a liquid state by heat, and reducing the mass to a powdered condition after cooling, substantially as described.

In testimony whereof I have hereunto set my hand in presence of two subscribing witnesses.

EDWIN W. GROVE.

Witnesses:
C. H. DUNCAN,
W. M. EVERETT.